| United States Patent [19]
Hirai et al.

[11] Patent Number: 4,689,388
[45] Date of Patent: Aug. 25, 1987

[54] ONE PACK TYPE ALICYCLIC EPOXY RESIN COMPOSITIONS

[75] Inventors: Kiyomiki Hirai, Kawasaki; Koji Takeuchi, Yokohama; Hiroshi Sakamoto, Ebina; Masahiro Abe, Tokyo, all of Japan

[73] Assignee: Ajinomoto Co., Inc., Tokyo, Japan

[21] Appl. No.: 824,545

[22] Filed: Jan. 23, 1986

[30] Foreign Application Priority Data

Jan. 24, 1985 [JP] Japan .................................. 60-11289
Feb. 22, 1985 [JP] Japan .................................. 60-33971

[51] Int. Cl.$^4$ ...................... C08G 59/60; C08G 59/64
[52] U.S. Cl. ..................................... 528/104; 528/111; 528/117; 528/337; 528/341; 528/361; 528/365; 528/407
[58] Field of Search ................. 528/99, 104, 111, 117, 528/337, 341, 361, 365, 407

[56] References Cited

U.S. PATENT DOCUMENTS 4,268,656 5/1981 Ray-Chaudhuri et al. .... 528/111 X
4,542,202 9/1985 Takeuchi et al. ............... 528/111 X
4,546,155 10/1985 Hirose et al. ................... 528/111 X
4,585,698 4/1986 Anzai et al. ..................... 524/466 X

*Primary Examiner*—Earl Nielsen
*Attorney, Agent, or Firm*—Oblon, Fisher, Spivak, McClelland & Maier

[57] ABSTRACT

A curable epoxy resin composition, comprising (1) an alicyclic epoxy resin having an average of more than one epoxy group per molecule, (2) a polybasic acid hydrazide, and (3) a latent curing agent for said epoxy resin which comprises an addition product obtained by reacting (a) a polyfunctional epoxy compound with (b) a compound having at least one functional group in the molecule selected from the group consisting of OH, SH, COOH and CONHNH$_2$ together with a tertiary amino group, or by reacting said components (a) and (b) with (c) an organic compound which has more than two active hydrogen atoms in the molecule, said reactions occurring under conditions in which the ratio of (a) to (b) or (a) to (b) and (c) ranges from 0.8 to 2.5 equivalents of (a) per equivalent of the total active hydrogen atoms in component (b) and in components (b) and (c), the molar ratio of (c) to (b) being 0.2:1 to 1:1, and said addition product having a softening point of 60° to 180° C.

9 Claims, No Drawings

ONE PACK TYPE ALICYCLIC EPOXY RESIN COMPOSITIONS

BACKGROUND OF THE INVENTION

1. Field of the Invention

The present invention relates to one pack type alicyclic epoxy resin compositions which can be cured at moderate, elevated temperatures and which have excellent storage stability at room temperature.

2. Description of the Background

It is known that alicyclic epoxy resins such as 3,4-epoxycyclohexylmethyl-3,4-epoxycyclohexane carboxylate have excellent weather resistance, and have good electrical insulation properties, thereby being useful as an electric insulating material, because the resins do not contain chlorine as an impurity. Generally speaking, bis-phenol type glycidyl ether epoxy resins are widely employed as electric insulating materials. However, the use of this material by the precision electronics industry poses some electrical related problems, because of the presence of residual chlorine as an impurity in the material. This impurity is conveyed from the raw materials. One-pack type epoxy resins are preferred to the conventional two-pack type epoxy resins, because the former cannot be misformulated and because they can be used continuously. A need therefore has continued to exist for an improved curing agent for a one-pack type epoxy resin.

It is pointed out that when alicyclic epoxy resins are cured, the same are combined with an acid anhydride as a latent curing agent. Acid anhydrides provide a long curing time. On the other hand, when the combination of an acid anhydride and a tertiary amine is used as the catalyst system for alicyclic epoxy resins, a resin composition of poor storageability results, and the cured resin exhibits a muddied appearance. A need therefore continues to exist for an improved catalyst system for one pack type epoxy resin compositions.

SUMMARY OF THE INVENTION

One object of the present invention is to provide one pack type alicyclic epoxy resin compositions which effectively provide for the cure of the resin component at low temperatures and which provide for superior storage stability of the resin component.

Another object of the present invention is to provide one pack type alicyclic epoxy resin compositions which can effectively activate rapid curing of the epoxy resin component of the composition at relatively low temperatures and yet which is extraordinarily resistant to gelling at 40° C. for more than one month.

Still another object of the present invention is to provide one pack type alicyclic epoxy resin compositions which give cured alicyclic epoxy resin products having excellent transparency.

Briefly, these objects and other objects of the present invention as hereinafter will become more readily apparent can be attained in a curable one pack type alicyclic epoxy resin composition comprising, (1) an alicyclic epoxy resin, (2) a polybasic acid hydrazide, and (3) a latent curing agent for the epoxy resin which comprises the addition product obtained by reacting (a) the polyfunctional epoxy compound with (b) a compound having at least one functional group in the molecule selected from the group consisting of OH, SH, COOH and $CONHNH_2$ together with the tertiary amino group, or by reacting said components (a) and (b) with (c) the organic compound which has more than two active hydrogen atoms in the molecule.

In another embodiment of the invention, the one pack type alicyclic epoxy resin composition is comprised of (1) an alicyclic epoxy resin, (2) a polybasic acid hydrazide, and (3)' imidazole or a derivative thereof.

In still another embodiment of the invention, the one pack type alicyclic epoxy resin composition is comprised of (1) an alicyclic epoxy resin, (2) a polybasic acid hydrazide or (2)' dicyandiamide and (3)' imidazole or a derivative thereof.

DETAILED DESCRIPTION OF THE PREFERRED EMBODIMENTS

The alicyclic epoxy resin component of the present composition includes such compounds as 3,4epoxycyclohexyl methyl-3,4-epoxy cyclohexane carboxylate (manufactured by Union Carbide Company, U.S.A. ERL-4221), bis(3,4-epoxy cyclohexyl methyl adipate (manufactured by Union Carbide Company, U.S.A. ERL-4229), 2-(3,4-epoxy cyclohexyl-5,5-spiro-3,4-epoxy) cyclohexane-meta-dioxane (manufactured by Union Carbide Company, U.S.A. ERL-4234), and diisodecylepoxy hexahydrophthalate (manufactured by SHIN-NIHON-RIKA Co., Ltd. RIKA-Resin E-10).

It is also possible to use the alicyclic epoxy resin component in combination with another epoxy resin component such as bisphenol A glycidyl ether.

The polybasic acid hydrazide component of the present composition includes such hydrazide derivatives as succinic dihydrazide, adipic dihydrazide, isophthalic dihydrazide, dodecanoic dihydrazide, eicosanoic dihydrazide, sebacic dihydrazide, and the like.

In order to produce the one pack type alicyclic epoxy resin composition of the present invention, the alicyclic epoxy resin component (1) and the polybasic acid dihydrazide component (2) are mixed with each other in relative amounts of 5–50 parts by weight of component (2) with 100 parts by weight of component (1). Alternatively, 100 parts by weight of the alicyclic epoxy resin component (1) are mixed with 1–20 parts by weight of the dicyandiamide component (2)'.

The imidazole reactant of the invention and its derivatives includes compounds such as imidazole, 2-methylimidazole, 2-ethylimidazole, 2-ethyl-4-methylimidazole, 2-undecylimidazole, 2-heptadecylimidazole, 2-phenylimidazole, 1-benzyl-2-methylimidazole, 1-cyanoethyl-2-methylimidazole, 2-phenyl-4,5-dihydroxymethylimidazole, 2,4-diamino-6{2'- undecylimidazolyl-(1')}ethyl-S-triazine, 1-cyanoethyl-2- methylimidazole trimellitate, and the like.

The organic compound reactant which has two or more active hydrogen atoms, but which contains no epoxy group, nor tertiary amino group, means any compound which has a hydrogen atom connected to oxygen, nitrogen, sulfur, or the like excluding carbon, or compounds containing hydrogen atoms in such functional groups as —OH, —NH, $-NH_2$, —SH, —COOH, and $-CONHNH_2$. Suitable examples of such organic compounds include polyhydric phenols such as bisphenol A, bisphenol F, bisphenol S, hydroquinone, catechol, resorcinol, pyrogallol, phenol-novolak resin, and the like; polyhydric alcohols such as trimethylol propane; amine compounds such as piperazine, aniline, and cyclohexylamine; polybasic carboxylic acids such as adipic acid, phthalic acid and 3,9-bis(2-carboxyethyl)-2,4,8,10-tetroxaspiro[5,5]-undecane; polythiols such as 1,2-dimercaptoethane and 2-mercaptoethylether; hydrazides such as phenylacetic acid hydrazide; amino acids such as alanine and valine; and compounds having at least two different functional groups in the molecule such as 2-mercaptoethanol, 1-mercapto-3-phenoxy-2-propanol, mercaptoacetic acid, N-methylethanolamine, diethanolamine, hydroxyaniline, N-methyl-o-aminobenzoic acid, anthranilic acid and lactic acid.

To produce an addition compound which is the latent curing agent of the present invention, components (a) and (b) are reacted in a ratio of 0.8 to 2.5 equivalent, preferably 0.9 to 1.5 equivalent of epoxy group in component (a) per one equivalent of active hydrogen in component (b). If the epoxy group is less than 0.8 equivalent per one equivalent of active hydrogen, the resulting addition product has a low softening point and cannot be readily crushed. Epoxy resin formulations which contain such addition products exhibit poor storage stability.

If the epoxy group is employed in excess of 2.5 equivalent per one equivalent of active hydrogen, the resulting addition product will be an insoluble solid with partial three-dimensional networks.

In order to produce the one pack type alicyclic epoxy resin composition of the present invention, 100 parts by weight of the alicyclic epoxy resin component (1) are reacted with from 0.1–10 parts by weight of imidazole (3)' or a derivative thereof, and from 0.5–40 parts by weight of the latent curing agent (3) for the epoxy resin are reacted with 100 parts by weight of epoxy resin component (1).

The one pack type alicyclic epoxy resin composition of the present invention can be used in combination with a known curing agent or an additive, if necessary.

Having generally described this invention, a further understanding can be obtained by reference to certain specific examples which are provided herein for purposes of illustration only and are not intended to be limiting unless otherwise specified.

The following examples illustrate the preparation of one pack type alicyclic epoxy resin compositions.

EXAMPLE 1

Preparation of latent curing agent A

A 10.6 gram amount of 1-(2-hydroxy-3-butoxypropyl)-2-methylimidazole (0.05 equivalent), 5.7 g of bisphenol A (0.05 equivalent) and 50 ml of methyl ethyl ketone as a solvent were mixed in a 200 ml three-necked flask equipped with a condenser and a stirrer.

To the stirred mixture was added dropwise 19 g (0.1 equivalent) of Epon 828 dissolved in 30 ml of methyl ethyl ketone over a period of 30 minutes. Then the stirred mixture was refluxed for 2 hours. The reaction mixture was concentrated under reduced pressure in order to remove methyl ethyl ketone and then was cooled to room temperature, thereby obtaining a pale yellowish solid. The crushed product prepared was identified as latent curing agent A.

EXAMPLE 2

Preparation of addition product of PG-MZ, BA and Epon 828, (latent curing agent B)

An 11.6 gram (0.05 equivalent) amount of 1-(2-hydroxy-3-phenoxypropyl)-2-methylimidazole (PG-MZ), 5.7 g (0.05 equivalent) of Bisphenol A and 50 ml of methyl ethyl ketone as the solvent were mixed in a 200 ml three-necked flask equipped with a condenser and a stirrer. To the stirred mixture was added dropwise 19 g (0.1 equivalent) of Epon 828 dissolved in 30 ml of methyl ethyl ketone over a period of 30 minutes while the temperature was maintained to 80° C. Then the stirred mixture was refluxed for 2 hours. The reaction mixture was concentrated under reduced pressure in order to remove methyl ethyl ketone and then was cooled to room temperature thereby obtaining a pale yellowish solid. The product had a softening temperature of 140° C. and was identified as latent curing agent B.

EXAMPLE 3

Reactivity, storage stability and glass transition temperature of a formulated epoxy resin composition 1. Preparation of samples A number of samples were formulated as shown in Tables 1 and 2. The samples were stirred for 1 hour while being defoamed under reduced pressure in a mixing and grinding machine.

2. Evaluation of reactivity (1) Onset temperature (Ti) and peak temperature (Tp) were measured by differential thermal analysis (DTA).

| Sample weight: | about 10 mg |
| --- | --- |
| Standard material: | α-Al$_2$O$_3$ |
| Heating rate: | 5° C./min. |

(2) Each sample was placed into a Geer's oven maintained at the desired temperature and the appearance of each resulting cured resin sample was observed.

3. Storage stability

Each sample was placed into a Geer's oven set to 30° C. and the day on which a given sample had become non-fluid was noted.

4. Glass transition temperature (Tg)

The Tg of each cured resin sample was measured with a thermal mechanical analysis apparatus (TMA, a product of Rigaku Corporation) by the TMA penetration method.

| Temperature rate increase: | 10° C./min. |
| --- | --- |
| Load: | 10 g |
| Diameter of needle: | 1 mm |

The results obtained are summarized in Tables 3 and 4.

TABLE 1

| | The present invention | | | | | | | Control | |
| --- | --- | --- | --- | --- | --- | --- | --- | --- | --- |
| Sample No. | 1 | 2 | 3 | 4 | 5 | 6 | 7 | 8 | 9 |
| Celoxide 2021*[1] | 100 | 100 | 100 | 100 | 100 | 50 | 50 | 100 | 100 |
| Epon 828 | | | | | | 50 | 50 | | |
| Adipic dihydrazide | 32 | 15 | | | 32 | 32 | | 32 | |

TABLE 1-continued

|  | The present invention | | | | | | | Control | |
|---|---|---|---|---|---|---|---|---|---|
| Sample No. | 1 | 2 | 3 | 4 | 5 | 6 | 7 | 8 | 9 |
| Isophthalic dihydrazide |  |  | 36 |  |  |  | 36 |  |  |
| Dodecanoic dihydrazide |  |  |  | 48 |  |  |  |  |  |
| Methyl hexahydrophthalate anhydride |  |  |  |  |  |  |  |  | 100 |
| Latent curing agent A Example 1 | 5 | 5 | 5 | 5 |  | 5 | 5 |  | 5 |
| Latent curing agent B Example 2 |  |  |  |  | 5 |  |  |  |  |

*[1]An alicyclic epoxy resin (manufactured by DAISERU CHEMICAL INDUSTRY COMPANY, epoxy group equivalent 133-135)
*[2]Bis-phenol A type epoxy resin (manufactured by Shell Chemical Co., Ltd., epoxy group equivalent 185-190).

TABLE 2

|  | The present invention | | | | | | | | Control | |
|---|---|---|---|---|---|---|---|---|---|---|
| Sample No. | 10 | 11 | 12 | 13 | 14 | 15 | 16 | 17 | 18 | 19 |
| Celoxide 2021*[1] | 100 | 100 | 100 | 100 | 100 | 100 | 100 | 100 | 100 | 100 |
| Adipic dihydrazide | 32 | 32 | 32 | 32 | 32 |  |  |  | 32 |  |
| Isophthalic dihydrazide |  |  |  |  |  | 36 |  |  |  |  |
| Sebacic dihydrazide |  |  |  |  |  |  | 43 |  |  |  |
| Dicyandiamide |  |  |  |  |  |  |  | 10 |  |  |
| Methyl hexadrophthalate anhydride |  |  |  |  |  |  |  |  |  | 100 |
| 2MZ | 2 |  |  |  |  | 2 | 2 | 2 |  | 1 |
| 2E4MZ |  | 2 |  |  |  |  |  |  |  |  |
| 1B2MZ |  |  | 2 |  |  |  |  |  |  |  |
| C17Z |  |  |  | 3 |  |  |  |  |  |  |
| C11Z, AZINE |  |  |  |  | 2 |  |  |  |  |  |

*[1]An alicyclic epoxy resin (manufactured by DAISERU CHEMICAL INDUSTRY Company, epoxy group equivalent 133-135)
2mZ: 2-Methylimidazole
2E4MZ: 2-Ethyl-4-methylimidazole
1B2MZ: 1-Benzyl-2-methylimidazole
C17Z: 2-Heptadecylimidazole
C11Z, AZINE: 2,4-diamino-6{2'-undecylimidazolyl-(1')}ethyl-S—triazine

TABLE 3

|  | Reactivity | | | Storage |
|---|---|---|---|---|
| Sample No. | Ti (°C.) | (Tp) (°C.) | Tg*[1] (°C.) | Stability (30° C.) |
| The present invention | | | | |
| 1 | 166 | 176 | 156 | >one month |
| 2 | 160 | 167 | 120 | " |
| 3 | 176 | 186 | 92 | " |
| 4 | 180 | 188 | 91 | " |
| 5 | 153 | 170 | 138 | " |
| 6 | 115 | 134 | 146 | " |
| 7 | 102 | 132 | 129 | " |
| Control | | | | |
| 8 | 180 | 183 | not cured | >one month |
| 9 | 119 | 144 | 107 | three days |

*[1]cured condition 150° C. × 2 hr

TABLE 4

|  | Reactivity | | | Storage |
|---|---|---|---|---|
| Sample No. | Ti (°C.) | (Tp) (°C.) | Tg*[1] (°C.) | Stability (30° C.) |
| The present invention | | | | |
| 10 | 143 | 160 | 172 | >one month |
| 11 | 177 | 189 | 138 | " |
| 12 | 164 | 168 | 166 | " |
| 13 | 172 | 190 | 152 | " |
| 14 | 171 | 190 | 125 | " |
| 15 | 116 | 142 | 124 | " |
| 16 | 140 | 160 | 165 | " |
| 17 | 124 | 169 | 124 | " |
| Control | | | | |
| 18 | 180 | 183 | not cured | >one month |
| 19 | 111 | 133 | 135 | three days |

*[1]cured condition 150° C. × 2 hr

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A curable epoxy resin composition, comprising:
   (1) an alicyclic epoxy resin having an average of more than one epoxy group per molecule,
   (2) a polybasic acid hydrazide, and
   (3) a latent curing agent for said epoxy resin which comprises an addition product obtained by reacting (a) a polyfunctional epoxy compound with (b) a hydroxy group and tertiary amino group containing compound, or by reacting said components (a) and (b) with (c) an organic compound which has more than two active hydrogen atoms in the molecule, said reactions occurring under conditions in which the ratio of (a) to (b) or (a) to (b) and (c) ranges from 0.8 to 2.5 equivalents of (a) per equivalent of the total active hydrogen atoms in component (b) and in components (b) and (c), the molar ratio of (c) to (b) being 0.2:1 to 1:1, and said addition product having a softening point of 60° to 180° C.

2. The curable epoxy resin composition of claim 1, which comprises (A) a mixture of 5-50 parts of polybasic acid hydrazide component (2) in 100 parts of the alicyclic epoxy resin component (1), and (B) a mixture of from 1-20 parts of an addition product component (3) per 100 parts of said alicyclic epoxy resin component (1).

3. A cured alicyclic epoxy resin composition prepared by the curing of the resin composition of claim 1.

4. A curable epoxy resin composition, comprising:
(1) an alicyclic epoxy resin, (2) a polybasic acid hydrazide or (2)' dicyandiamide, and (3)' imidazole or its derivatives.

5. A cured alicyclic epoxy resin composition prepared by the curing of the resin composition of claim 4.

6. The curable alicyclic epoxy resin composition of claim 4, wherein the ratio of said imidazole or its derivative component (3)' and said alicyclic epoxy resin component (1) ranges from 0.1-10:100.

7. The curable epoxy resin composition of claim 4, wherein said imidazole derivative is 2-methylimidazole, 2-ethylimidazole, 2-ethyl-4-methylimidazole, 2-undecylimidazole, 2-heptadecylimidazole, 2-phenylimidazole, 1-benzyl-2methylimidazole, 1-cyanoethyl-2-methylimidazole, 2-phenyl-4,5-dihydroxymethylimidazole, 2,4-diamino-6{2'-undecyl-imidazolyl-(1')}ethyl-S-triazine, or 1-cyanoethyl-$\alpha$-methylimidazole trimellitate.

8. The curable epoxy resin composition of claim 1, wherein said polybasic acid hydrazide is succinic dihydrazide, adipic dihydrazide, isophthalic dihydrazide, dodecanoic dihydrazide, eicosanoic dihydrazide or sebasic dihydrazide.

9. The curable epoxy resin composition of claim 1, wherein the ratio of components (a) to (b) and (a) to (b) and (c) ranges from 0.9 to 1.5 equivalents of (a) per equivalent of total active hydrogen atoms in component (b) and in components (b) and (c).

* * * * *